W. J. BIRDSALL.
Vulcanizing Apparatus.
No. 161,656.            Patented April 6, 1875.
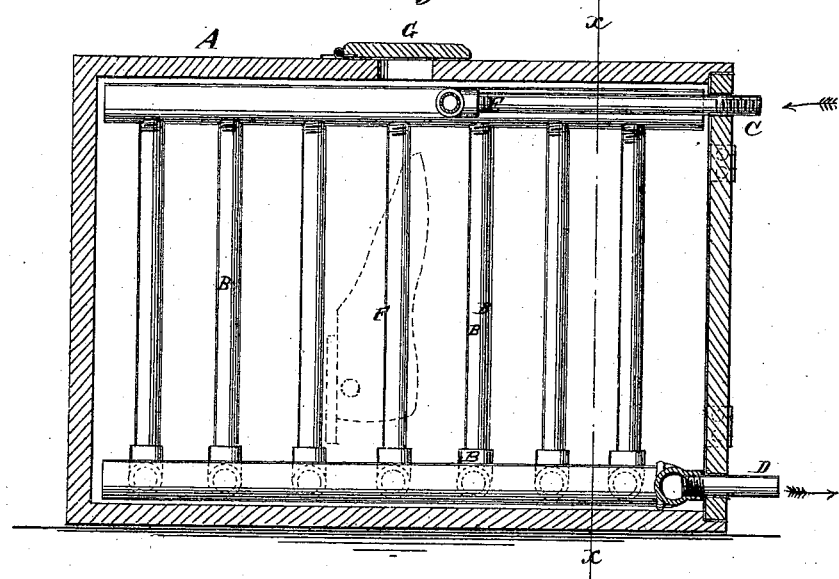
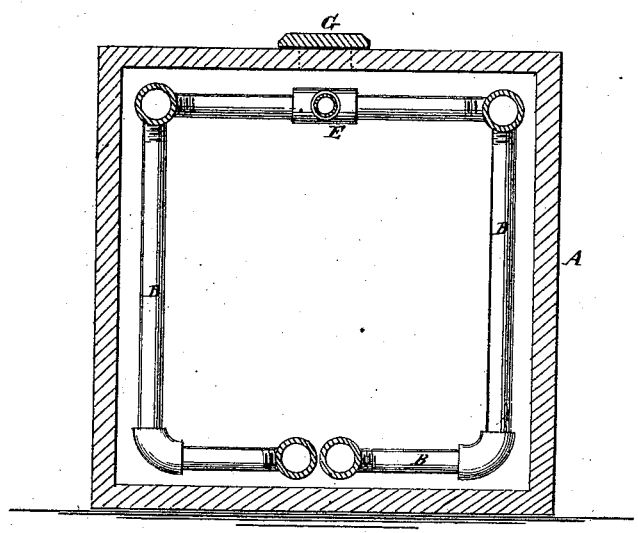

UNITED STATES PATENT OFFICE.

WILLIAM J. BIRDSALL, OF NAUGATUCK, CONNECTICUT.

IMPROVEMENT IN VULCANIZING APPARATUS.

Specification forming part of Letters Patent No. 161,656, dated April 6, 1875; application filed February 5, 1875.

*To all whom it may concern:*

Be it known that I, WILLIAM J. BIRDSALL, of Naugatuck, in the county of New Haven and State of Connecticut, have invented a new and useful Improvement in Vulcanizing-Chambers, of which the following is a specification:

The object of this invention is to construct a chamber or oven for vulcanizing rubber shoes and boots, so that they will not be exposed to fire heat, but to the heat of steam.

The invention will first be fully described, and then pointed out in the claim.

In the accompanying drawing, Figure 1 is a vertical section of the chamber. Fig. 2 is a vertical section on the line $x\ x$ of Fig. 1.

Similar letters of reference indicate corresponding parts.

A is a tight chamber, made of any suitable material, and of any desired size and proportions. B are steam-pipes, arranged on the inside of the chamber in any manner to convey the heat of the steam to the chamber. These steam-pipes are connected together, and connected with an induction-pipe, C, and an exhaust-pipe, D, arranged in any manner to convey the steam to and from the steam-pipes. The steam-pipes are arranged in this example of my invention on the sides and bottom of the chamber, connected by a cross-pipe, E, at the top, so that the heat of the steam will be evenly distributed throughout the chamber. In the front of chamber are doors, which open in each direction to give ingress to the chamber, for placing the shoes or boots to be vulcanized. F represents a shoe thus placed; but the boots and shoes may be suspended by wires or strings from the top of the chamber, or attached to strips of wood by nails or otherwise, or arranged in any manner so that they will be properly exposed to the heat. The heat thus derived from the steam may be at any temperature to produce the desired effect. G is a valve which covers an aperture in the top of the chamber for letting off any surplus heat. In the side of the chamber, or attached to the doors in any manner, a thermometer is placed for regulating the temperature.

It is well understood that heat from steam is more moist than air heated by the direct application of fire. The rubber goods vulcanized in a steam-heated chamber are soft and silky to the touch, and far superior to those vulcanized in dry heated air.

Having thus described my invention, I claim as new and desire to secure by Letters Patent—

In a vulcanizing apparatus, the combination of the steam-pipes B C D and cross-pipes E within, on the bottom, and on the sides of the chamber A, as and for the purpose specified.

WILLIAM J. BIRDSALL.

Witnesses:
H. C. BALDWIN,
N. A. SMITH.